Patented Mar. 19, 1935

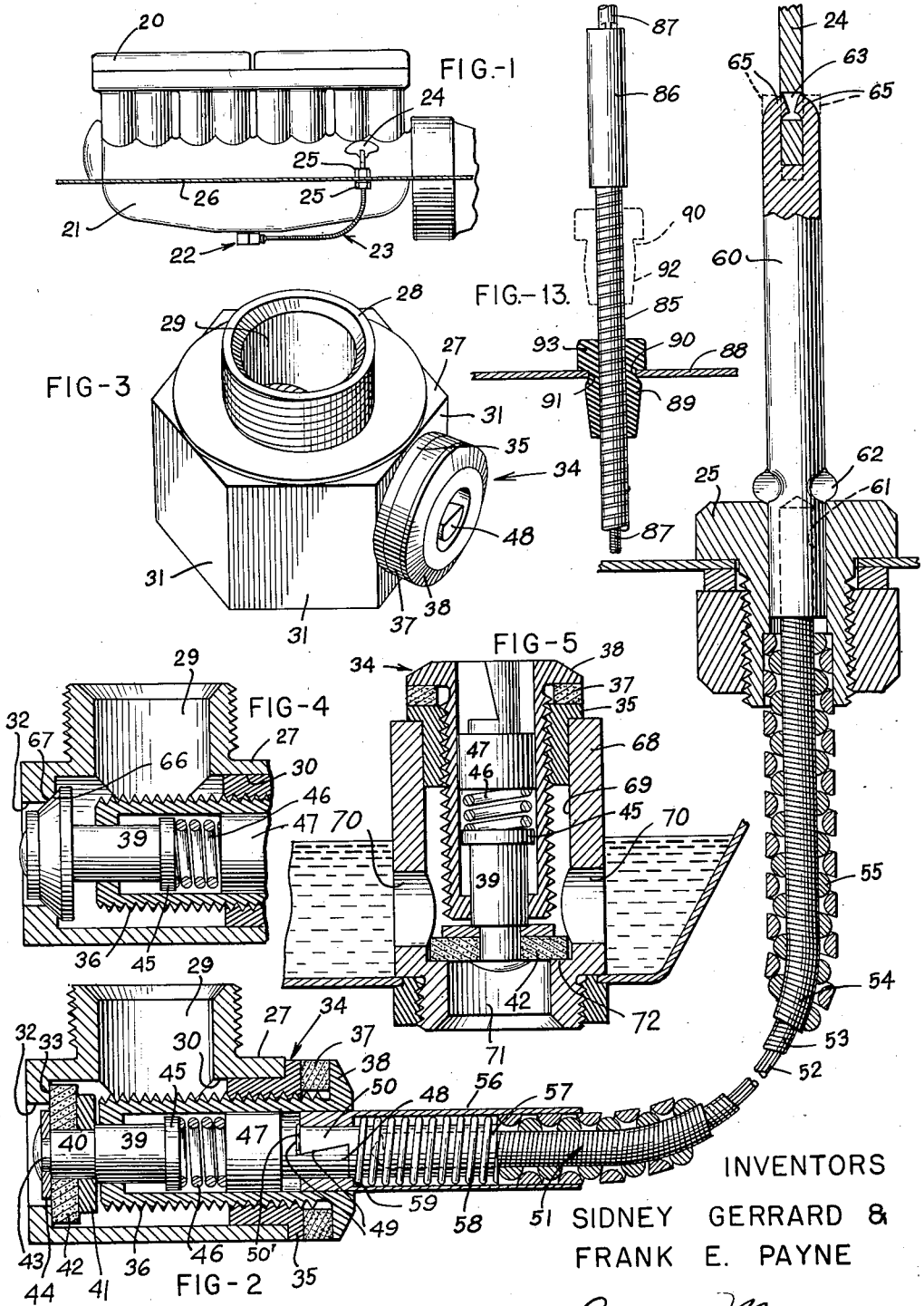
March 19, 1935.  S. GERRARD ET AL  1,995,174
DRAIN VALVE MECHANISM
Filed Aug. 19, 1933  2 Sheets-Sheet 1
INVENTORS
SIDNEY GERRARD &
FRANK E. PAYNE
BY Cox & Moore
ATT'YS.

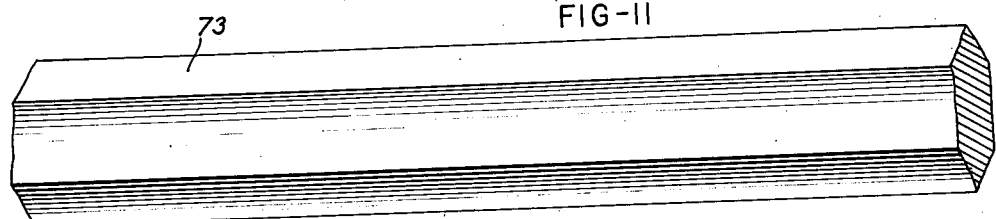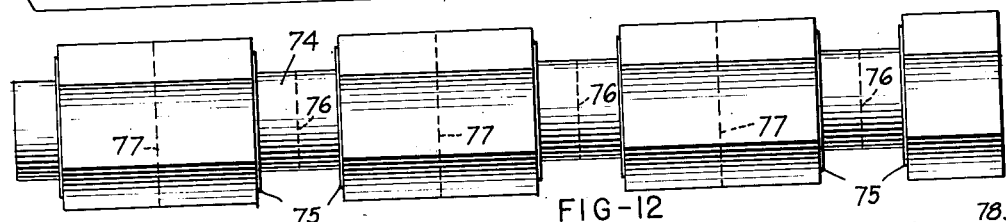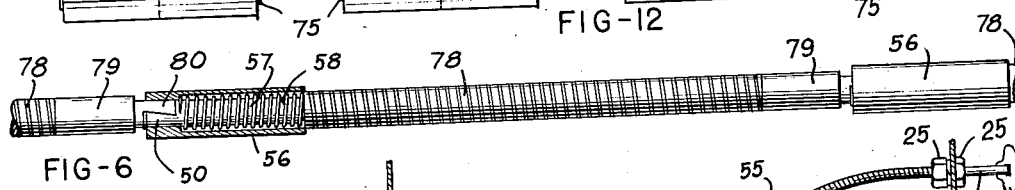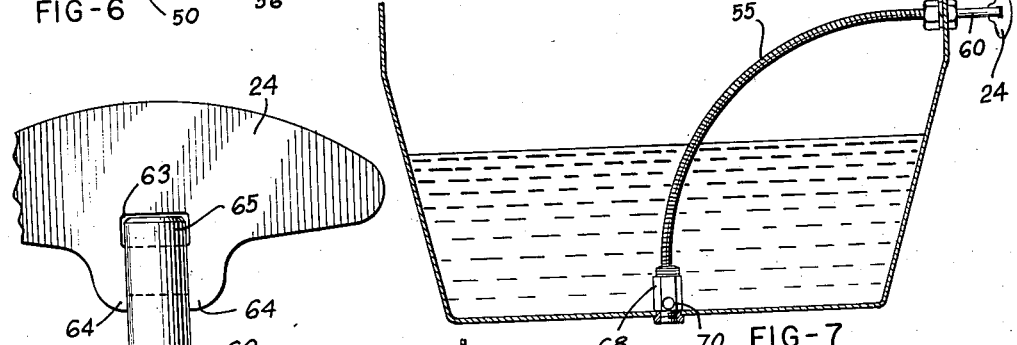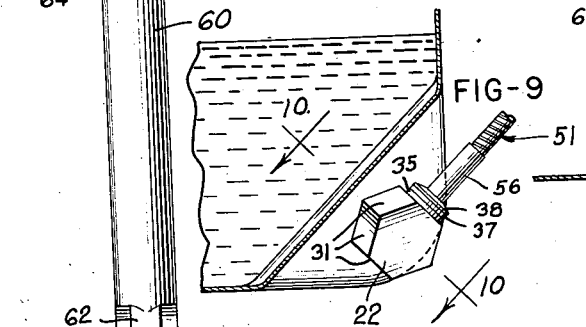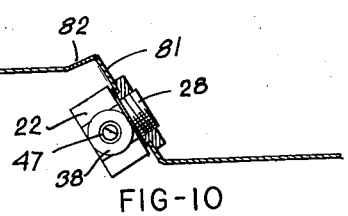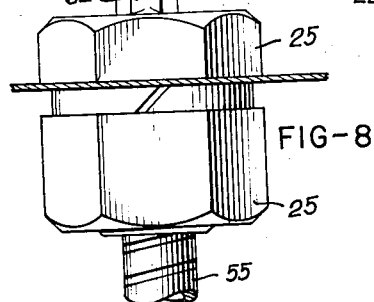

1,995,174

UNITED STATES PATENT OFFICE 1,995,174

DRAIN VALVE MECHANISM

Sidney Gerrard and Frank E. Payne, Chicago, Ill.; said Gerrard assignor to Crane Packing Company, Chicago, Ill., a corporation of Illinois Application August 19, 1933, Serial No. 685,928

1 Claim. (Cl. 137—34)

The present invention relates to valves and particularly valves which are to be used as drain valves for automobile crank cases and the like, and has for one of its objects, the provision of a simple drain valve which is sturdily constructed, simple, and cheap to manufacture, and efficient in its operation.

Another object of this invention is to provide a small drain valve of relatively large capacity for the size of the body of the valve and one which can readily be constructed of bar stock material or the like, whereby one can use cold rolled steel, and after forming the solid body from the cold rolled steel bar, the same may be bored to provide the necessary passageways to permit the oil to flow therethrough and to provide openings which may be used to accommodate the valve mechanism.

Another object of this invention is to provide a valve which is yieldingly seated on its seat and in which the yielding means for the valve is compactly arranged so as to take up a minimum amount of space, whereby the valve may be made smaller than would otherwise be possible. In order to achieve this result, the yielding means for pressing the valve against its seat is embodied in what we shall refer to as the valve stem or valve advancing means.

Another object of this invention is to provide a valve in which the peripheral portion of the body is formed with flat sides, whereby a wrench or the like may be used to turn the valve when threading the valve into a suitable opening in the bottom of the crank case, or threading it into its operative position.

Another object of this invention is to provide a valve body which is substantially prismatic in form.

Another object of this invention is to provide a valve operating means which is flexible and which will enable one to bring the operating end of the valve operating means into a readily accessible position either at the side of the engine or on the dashboard of an automobile, the valve operating means being capable of transmitting torsional forces for rotating the valve itself and advancing it against its seat.

Another object of this invention is to provide a detachable valve operating means which can be readily attached by manual pressure to the valve stem or released by manual pressure when desired, but which will positively hold the valve operating means connected to the valve stem against displacement therefrom except when manual pressure of a particular type and in a particular direction is applied thereto or to a portion thereof provided for that purpose.

Another object of this invention is to provide a valve operating means which comprises a plurality of sections all of which are similarly constructed and which can be used to make the flexible valve operating means as long or as short as necessary. Of course, the minimum length would be determined by the length of one section, but sections of different lengths could be provided. With such a construction, it is possible to provide a valve operating means of a given length for a desired job which is as long as required but which is not materially longer than is required. Thus if one wished to operate the valve from beneath the automobile hood, one section or at the most perhaps two sections of the valve operating means could be used and if, either when the installation was made or subsequently thereto, it was desired to extend the valve operating means to the dashboard, additional sections could be added without any trouble. This further simplifies the manufacture, as one could standardize the equipment by constructing sections, all of which are of the same length, and placing them in stock to be used on different jobs, or making sections of just a few different lengths which in combination could be used on practically any job.

Another object of this invention is to provide a detachable flexible valve operating means which need not be connected to the valve until after the valve itself is installed, and without the use of tools for that purpose. This is particularly advantageous for use on automobile engines, especially where there is only sufficient room for the valve itself and one accessible point through which the valve operating means may extend. With known types of valves either a special means must be provided for connecting the valve operating means to the valve after it is installed or if the valve operating means is connected to the valve before the valve is installed, it in some instances cannot be installed readily due to the projections and obstructions on the crank case of the automobile or other part to which the valve is applied.

Another object of this invention is to construct a valve which can be mounted inside the crank case as well as outside the crank case, and the operating means therefor partially arranged within the crank case and extending outside the crank case, preferably at about the oil level thereof so as to make it unnecessary to take particular pains in making the opening through which the operating means extends entirely leak-proof, as would be necessary where the operating means extends through the crank case or body of the engine below the liquid level or closely adjacent thereto. However, the valve operating means can be passed through the side of the crank case itself, with suitable packing glands to be used if desired. In this way, the entire valve and valve operating means can be removed with the removable part of the crank case, and a particular result which is to be obtained in arranging the valve within the crank case is that one can decrease the road clearance for an automobile more than is possible where the valve extends outside the crank case below the same as generally the bottom of the crank case and the oil opening therein are at a very low level. This also prevents the valve from accumulating foreign material such as is usually deposited on the bottom of a crank case due to the splashing of mud, etc.

Another object of this invention is to provide a resilient socket for holding the free end of the valve operating means in position. The resilient mounting is preferably a rubber sleeve which is adapted to fit within an opening in the mud pan of an automobile. The same embraces the operating means and is compressed sufficiently when inserted in the opening to firmly grip the operating means and prevent a substantial longitudinal movement thereof. It also eliminates rattling of the operating means due to the vibration of the car, and makes a construction which is efficient and readily applied.

Another object of this invention is to provide a valve which can be readily constructed from bar stock in a very cheap and efficient manner.

Another object of this invention is to provide a method for manufacturing valve bodies from bar stock.

Another object of this invention is to provide a valve body which can be readily formed from cold rolled steel bars.

Other objects of this invention will appear hereinafter as the description of this invention proceeds, the novel features, arrangements, and combinations being clearly pointed out in the specification and the claim hereunto appended.

In the drawings:

Fig. 1 shows an elevational view of an automobile engine with our invention shown somewhat enlarged applied thereto;

Fig. 2 is a longitudinal cross-sectional view through one form of our invention which is shown in Fig. 1;

Fig. 3 is a perspective view of the valve without the operating means connected thereto;

Fig. 4 is a modification showing a valve of a different type than that illustrated in Fig. 2;

Fig. 5 shows one form of our invention as constructed for use within the crank case instead of exteriorly thereof as in Figs. 1, 2, and 3;

Fig. 6 is a view partly in section of a modification of the valve operating means which is to be used when a longer operating means is desired;

Fig. 7 shows the method of operating the valve shown in Fig. 5;

Fig. 8 is an elevational view of the operating handle looking from the left in Fig. 2;

Fig. 9 illustrates the application of our invention to a different type of crank case than shown in the other figures;

Fig. 10 is a cross-section taken substantially along the line 10—10 of Fig. 9;

Fig. 11 is a view of the bar stock from which our valve body can be formed;

Fig. 12 illustrates the method in which the bar stock shown in Fig. 11 is formed in preliminary operations to produce the valve body; and Fig. 13 is an elevational view of a modification of the means for holding the operating means for the valve in place, portions thereof being shown in section;

In the drawings, reference character 20 indicates an automobile engine having a crank case 21. A valve 22 embodying our invention is shown threaded into the bottom of the crank case and a flexible operating means 23 connects the valve which is arranged beneath the crank case to an operating handle 24 secured by the nuts 25 to the mud pan 26 or side frame of an automobile. The flexible control 23 may be longer than illustrated in the drawings and extend to the dashboard of an automobile or to any other desired place, but it is preferable to use a flexible control so that the valve can be operated from any desired position and can be readily installed without the necessity of exercising extreme care in the operating handle as is necessary with a great many controls. The valve shown in the drawings comprises a valve body 27 which is prismatic in form with a threaded boss 28 extending outwardly from one end thereof. The boss 28 has a bore 29 which extends partially through the valve body and communicates directly with another bore 30 extending at substantially right angles to the bore 29 from one face 31 of the prismatic body through the opposite face of the body, the bore having a reduced portion 32 with a valve face 33 adjacent thereto against which the valve is adapted to seat. In Fig. 2 this seat is illustrated as a flat annular seat. In the form of the invention shown in Fig. 2, a bushing 34 is press-fitted into the bore 30 and has a flange 35 which abuts against an adjacent face 31. The bushing 34 is threaded interiorly to receive a hollow threaded sleeve 36 and a washer 37 is arranged between the flange 35 on the bushing 34 and a flange 38 on the sleeve 36, so that when the sleeve 36 is in the position illustrated in Fig. 2, the washer 37 is between the flanges 35 and 38 and forms a leak-proof joint through which the liquid cannot escape. Fig. 2 illustrates the closed position of the valve.

Slidably mounted within a suitable bore in the left hand end of the sleeve 36 is a valve stem 39 having a reduced portion 40 on which there is mounted a metal washer 41, and a leather or fiber washer 42. The reduced portion 40 also has a still greater reduced portion 43 extending therefrom and this is upset over a washer 44 thereon whereby the washer 42 is held between the washers 41 and 44. The stem 39 has a head 45 thereon which limits its movement to the left relative to the sleeve 36 and a spring 46 is arranged between the head 45 and a cylindrical abutment member 47, press-fitted into the hollow sleeve 38.

The cylindrical abutment member has a substantially cylindrical extension 48 with a portion thereof cut away to provide a notch in the cylindrical extension 48, the lines 49 indicating in Fig. 2 the flat sides of the notch. This forms sort of a dove-tail on the extension 48 which cooperates with a similar dove-tailed portion 50 on the end of a flexible control element 51 which control element comprises an inner stranded cable 52 and reversely wound helical members 53 and 54 closely embracing the inner stranded cable 52 and helical element 53 respectively to produce a flexible control which can transmit torsional forces in either direction. The flexible control element 51 is arranged rotatably within the flexible casing 55 of any desired type, but preferably one which will exclude foreign matter therefrom.

Closely embracing the outer surface of the flexible casing 55 is a sleeve 56 adapted to be slid longitudinally of the casing and the outer diameter of this sleeve is substantially equal to the inner diameter of the sleeve 36. The sleeve 56 has an inner diameter of the left hand and as viewed in Fig. 2 of substantially the same outer diameter as the combined projections 48 and 50. Thus when the sleeve is in the position illustrated in Fig. 2, the projections 48 and 50 cannot be separated and the torsional force of the control element 51 is transmitted to the abutment 47 and consequently to the sleeve 36 which since it is rotatably threaded into the bushing 34 is caused to have longitudinal movement therein to move the valve 42 to and from engagement with its seat 33.

Arranged within the sleeve 56 and about the cylindrical portion 57, integral with the extension 50, is a spring 58 which abuts against the end of the casing 55 and the shoulder 59 on the sleeve 56 to urge the sleeve normally to the left as viewed in Fig. 2. If the sleeve is moved manually to the right, until it clears the extension 48 and sleeve 36, the extensions 48 and 50 may be separated by lateral and longitudinal movement of the same relative to each other. It is readily apparent therefore that a very simple connecting means is provided for connecting the valve operating means to the valve itself, whereby one is able to first apply the valve to the crank case and then by a very simple operation attach the control element thereto. The end of the projection 50 is peened over slightly after the sleeve 56 is in place to prevent the spring 58 from moving the sleeve 56 off the end of the operating means when the operating means is detached from the valve.

The handle comprises a stem 60 which has a bearing in the nut 25 and is attached to the flexible control element 51 in any suitable manner. However, we prefer to form the end of the stem with a bore 61 into which the flexible control element extends and is suitably fastened as by means of swaging, soldering, or the like. I upset the sides of the stem at 62 to prevent the stem from being moved in a downward direction through the nut 25. The handle proper is a flat metal plate 24 having a rectangular opening 63 therein and depending ears 64. The stem has ears 65 which normally occupy the dotted line position shown in Fig. 2 before the handle is assembled. After the handle is assembled with the ears 64 straddling the sides of the stem 60, the ears 65 are pressed into the opening 63 to securely lock the handle and stem together.

In Fig. 4 we have shown a modification of our invention in which similar reference numerals indicate corresponding parts to those described in connection with the form of the invention shown in Fig. 2. This form of the invention differs from that shown in Fig. 2 only in the type of valve which is used. This valve preferably has a beveled seat 66 thereon adapted to cooperate with the beveled seat 67.

When the valve is to be applied to the crank case, the operating means therefor is detached therefrom in the manner already described and the valve is threaded into the opening provided for the ordinary drain plug at the bottom of the crank case, a wrench being applied to the faces 31 to tighten the valve in place. When the valve is in place, the operating means therefor is attached thereto and either at that time or prior to that time the lock nuts 25 are used to lock the upper end of the operating means in place.

In Fig. 5 we have shown a still further modification of our invention which is to be used when the valve itself is arranged inside of the crank case. In this form of the invention, a prismatic piece of stock 68 is provided with a bore 69 and bores 70, the latter being formed by a single boring operation through the stock. The lower end of the bore 69 is reduced at 71 to provide a seat 72 for the valve 42, similar reference characters being used to designate similar parts illustrated in Fig. 2. The operating means for the valve is shown connected thereto in Fig. 7 and the handle, as is readily apparent from the drawings, extends outside of the casing and the lock nuts 25 hold the operating handle and operating means for the valve in place.

In all forms of the invention which have just been described, the rotation of the operating means advances the valve against its seat with a yielding pressure and due to the fact that the stems 39 of the valves can rotate relative to the sleeves 38, it is obvious that there need be no turning movement between the valves and their seats. Consequently the valves do not wear appreciably and a more perfect seal is provided. In the forms of the invention shown in Figs. 2 and 4, the sleeves 36 are advanced until the washer 37 is tightly compressed between the flanges 35 and 38, whereby no leakage of the oil in the crank case is possible.

The valve body may be formed from a hexagonal or multi-sided cold rolled steel bar 73 shown in Fig. 11 by turning the same down in a lathe to produce the cylindrical portions 74 and 75 and thereafter severing the bar longitudinally along the lines 76 and 77. The valve body is then formed with the bores 29 and 30 respectively or in the form of the invention shown in Fig. 5, the bores 69 and 70 are formed. Also the reduced portions 74 which form the bosses 28 are threaded externally. The other parts of the valve are then assembled in the manner which has been previously described.

In Fig. 6, we have shown an operating means comprising a plurality of sections similarly constructed whereby an operating means of any desired length may be produced. The left hand end of each section 78 is formed identical with that illustrated for the lower left hand end of the operating means shown in Fig. 2 and the opposite end of the control element instead of having an operating handle such as 60 thereon is provided with a cylindrical member 79 with an extension 80 thereon similar to the extension 48. In this figure, the same reference characters are used to designate similar parts in Fig. 2.

In Figs. 9 and 10, we have shown a crank case in which the drain opening is in a flat portion 81 which is contiguous with an offset portion 82, which offset portion interferes with the insertion of a valve of any appreciable size or one to which the operating means is attached. This construction is found in an automobile of well known make and when using a simple drain opening with a plug to close the same, it is very easy to remove the plug and permit the oil to drain therefrom. Even an ordinary type valve could not be inserted readily in the small space provided and therefore my invention is particularly adaptable to such a construction for the valve can be first threaded into place and the operating means therefor subsequently connected thereto. The valve is made very compact due to the novel features of its construction and without sacrificing sturdiness required in a valve of this character. There is more involved here than just the mere reduction in size of the valve for in reducing the size of the valve, it is necessary to sacrifice strength of the valve parts which comprise the valve.

Due to the fact that the valve can be formed from cold rolled steel bars, a very strong body is provided which will resist the tearing down forces of a wrench used in applying the valve to the crank case. Cast metals and the like are not so resistant. The flexible operating means permits one to operate the valve from any desired position and furthermore enables one to very readily connect the valve and operating means therefor. The provision of a multiple section operating means permits one to standardize equipment for making the operating means and enables a garage or the like to provide themselves with a number of sections of the same length and use the same for a number of installations requiring different lengths of operating means.

In connection with the process of making the valve body, it is obvious that if instead of severing the bar along the lines 77 and 76, the reduced portions of the bar may be made shorter and closer together so as to have the reduced portions equal only to the length of the extension 28 itself and the intermediate prismatic portions equal to the length of the valve body so that by severing the bar through the reduced sections of the bar closely adjacent the prismatic portions thereof, valve bodies may be constructed which are of the proper size and shape, but we prefer to use the method shown in the drawings in view of the fact that it reduces the number of turning operations and does not increase the number of cutting operations.

In Fig. 13 the reference character 85 represents a flexible casing having a ferrule 86 over the end thereof and in which the control member 87 rotates. The ferrule 86 takes the place of the threaded bushing or locknut 25 shown in Fig. 2. The mud pan 88, however, has an opening therein substantially larger than the flexible casing 85, and a rubber sleeve preferably recessed peripherally at 90 embraces the flexible casing 85, and is pressed firmly within the opening 91, the same being compressed during the insertion of the same into the opening 91. The sleeve is tapered at 92 to a size which will permit the same to enter freely the opening 91 and effect a wedging action which compresses the sleeve as the same is forced down into the opening thus causing the sleeve to grip the casing 85 firmly. The upper end of the sleeve 89 is provided with an enlarged head 93 to limit its downward movement. With this arrangement any portion of the casing 85 may be held whereas with a construction such as is shown in Fig. 2, it is possible only to clamp a given portion thereof to either the mud pan or to some other support. Of course, it will be understood that while we have designated the part 88 as a mud pan the same could be the dashboard, or other part of an automobile, or other device with which same is used. The sleeve 89 may be made of other material than rubber but rubber has been found to be the most practical and economical material from which to construct the same, and is preferred.

Obviously those skilled in the art to which this invention pertains may make various changes in the particular construction and arrangement of parts without departing from the spirit of this invention or the scope of the appended claim and therefore we do not wish to be limited except as hereinafter set forth in the appended claim.

Having thus fully described our invention, what we claim as new and desire to obtain by Letters Patent is:

A drain valve of the class described, comprising a valve body having aligned openings, one of which forms a valve seat and the other of which is threaded, a valve actuating member threaded into said threaded opening, whereby the same is advanced longitudinally upon rotation thereof in a direction toward and from said seat, a valve on said actuating member rotatable about an axis substantially concentrically arranged with respect to the axis of rotation of said member and being longitudinally slidable relative thereto, a spring for urging said valve relative to said member in a direction toward said seat, and a stop for limiting the movement of said valve on said actuating member under the influence of said spring, whereby said valve can be retracted from said seat upon actuation of said actuating member, said actuating member having a laterally extending flange thereon and yielding packing arranged between said flange and the portion of said body surrounding the threaded opening, the said flange being so arranged on said actuating member as to compress said packing firmly against the valve body surrounding said threaded opening to prevent leakage of fluid through said threaded opening between said actuating member and valve body when said valve is fully closed.

SIDNEY GERRARD.
FRANK E. PAYNE.